United States Patent [19]

Moriguchi et al.

[11] 4,070,440

[45] Jan. 24, 1978

[54] METHOD OF REDUCING $NO_x$ PRESENT IN AN EXHAUST TO HARMLESS $N_2$

[75] Inventors: Sanseki Moriguchi, Yokohama; Hiroshi Abe, Kanagawa; Joichi Takenaka, Yokohama; Hideyuki Yoshikoshi, Hino; Osamu Komatsu, Yokohama, all of Japan

[73] Assignee: Nippon Kokan Kabushiki Kaisha, Tokyo, Japan

[21] Appl. No.: 720,603

[22] Filed: Sept. 7, 1976

[30] Foreign Application Priority Data

Sept. 5, 1975 Japan .................................. 50-107623
Sept. 5, 1975 Japan .................................. 50-107624

[51] Int. Cl.² .............................................. B01D 53/34
[52] U.S. Cl. ..................................... 423/239; 252/472
[58] Field of Search ........................... 423/213.5, 239; 252/472

[56] References Cited

U.S. PATENT DOCUMENTS

| | | | |
|---|---|---|---|
| 3,839,224 | 10/1974 | Yowehara et al. | 423/213.5 |
| 3,953,575 | 4/1976 | Gidaspow | 423/239 X |
| 3,959,400 | 5/1976 | Mizuno et al. | 423/239 |
| 4,003,711 | 1/1977 | Hishinuma et al. | 423/239 X |

FOREIGN PATENT DOCUMENTS 2,460,681   7/1975   Germany.

OTHER PUBLICATIONS

Stein et al.; *Industrial & Engineering Chem.;* vol. 52, No. 8.; Aug. 1960.

*Primary Examiner*—G. O. Peters
*Attorney, Agent, or Firm*—Flynn & Frishauf

[57] ABSTRACT

A method for reducing $NO_x$ gas contained in an exhaust gas to harmless $N_2$ gas with $NH_3$ gas using an iron oxide catalyst, characterized in that said iron oxide catalyst comprises a substance consisting essentially of hematite crystals ($\alpha$-$Fe_2O_3$), and the peak intensity of X-rays diffracted on the (110) plane of the lattice of said crystal has a ratio of 0.6 to about 1.0 to that of X-rays diffracted on the (104) plane of said crystal lattice.

2 Claims, 8 Drawing Figures

METHOD OF REDUCING NO$_x$ PRESENT IN AN EXHAUST TO HARMLESS N$_2$

This invention relates to a method of reducing NO$_x$ gas present in an exhaust to harmless N$_2$ gas with NH$_3$ gas using an iron oxide catalyst.

It is strongly demanded from the standpoint of a countermeasure against environmental pollution to eliminate nitrogen oxide gases such as NO, N$_2$O$_3$ and NO$_2$ (hereinafter collectively referred to as "NO$_x$ gas") from an exhaust resulting from combustion of fuel or an exhaust evolving from chemical reactions. Though research has hitherto been conducted regarding the method of removing the NO$_x$ gas, yet no easy and inexpensive resolving process has been developed to date. Most noticeable among the processes currently studied are those which reduce the NO$_x$ gas to harmless N$_2$ gas with NH$_3$ gas, using a catalyst formed of noble or heavy metals such as platinum, cobalt, copper or nickel in accordance with any of the following chemical equations.

$$6NO + 4NH_3 = 5N_2 + 6H_2O$$

$$N_2O_3 + 2NH_3 = 2N_2 + 3H_2O$$

$$6NO_2 + 8NH_3 = 7N_2 + 12H_2O$$

Also known is another NO$_x$ gas-removing method which uses pure iron oxide (Fe$_2$O$_3$) held on a carrier as the catalyst. Since, however, production of pure iron oxide consumes a great deal of time and work, this method is also practically useless.

We have previously disclosed inexpensive iron oxide catalysts easy to handle in Japanese pre-laid-open Patent Application No. 101,275/75 (laid open on Aug. 11, 1975) and another Japanese pre-laid-open Patent Application No. 59,086/76 (laid open on May 22, 1976). In these cases, the iron oxide catalyst consisted of an iron ore, iron dust, pyrite cinder or iron dust collected in an ironworks. However, it was disclosed that these iron-oxide containing materials did not always present higher catalytic activity or longer effective life in proportion to the content of Fe, and that their catalytic activity and effective life widely varied with the kind and source of the material.

Comparison was made between the mean degrees of catalytic activity of various forms of iron-oxide containing materials for removal of the NO$_x$ gas, the results being presented in Table 1 below.

Table 1

Mean NO$_x$ gas-removing degree of various iron oxide catalysts

| Sample | Mean NO$_x$ removing degree (%) |
|---|---|
| Robe River iron ore (Australia) | 100 |
| Pyrite cinder | 71.9 |
| Iron oxide recovered from pickling solution | 79.2 |
| Fe$_2$O$_3$ reagent (No. 1) | 72.3 |
| Fe$_2$O$_3$ reagent (No. 2) | 51.0 |
| Hamersley iron ore (Australia) | 84.0 |
| Krivoy Rog iron ore (U.S.S.R.) | 15.6 |
| Sungei Gau iron ore (Malaya) | 100 |
| Sintered iron ore | 2.6 |

The degree of removing NO$_x$ gas given in Table 1 represents a mean value calculated by the following formula.

$$\frac{\left(\begin{array}{c}NO_x \text{ content of an} \\ \text{untreated exhaust}\end{array}\right) - \left(\begin{array}{c}NO_x \text{ content of a} \\ \text{treated exhaust}\end{array}\right)}{(NO_x \text{ of an untreated exhaust})} \times 100$$

The comparison tests whose results are set forth in Table 1 were carried out as follows. A quartz tube was charged with 5 c.c. of a catalyst having a particle size of 0.5 to 1.0 mm. A purposely prepared gaseous mixture of 170 ppm of NO, 14% of O$_2$, 500 ppm of NH$_3$ and N$_2$ as the remainder was passed through the quartz tube at the rate of 25 liters per hour, the space velocity becoming 5000 per hour, with the temperature of the quartz tube kept at about 300° C. The iron ores listed in Table 1 above were dehydrated by being preheated 30 minutes at 300° C before the use in the catalytic reaction, the reason being described later.

As apparent from Table 1, a high purity chemical reagent of Fe$_2$O$_3$ did not unexpectedly present a considerably high catalytic activity. Some of the commercially available forms of Fe$_2$O$_3$ had a low-catalytic activity. The iron ores widely varied in catalytic activity according to the place of origin. Sintered iron ore showed little catalytic activity.

It is accordingly the object of this invention to discover what type of inexpensive iron-oxide containing material has a sufficiently high catalytic activity to remove the NO$_x$ gas and can be easily selected as an optimum form of such catalyst based on said discovery, thereby improving the efficiency of removing the NO$_x$ gas.

In order to attain the object, we made studies and experiments to determine the factors which could prominently elevate the catalytic activity of various iron-oxide containing materials. As a result, it has been discovered that a catalyst for reduction of NO$_x$ gas with ammonia should indispensably contain hematite ($\alpha$-Fe$_2$O$_3$), and moreover that an optimum crystalline structure of said hematite can be determined by X-ray diffraction analysis. Namely, it has been found that an iron-oxide essentially consisting of crystalline hematite, wherein the peak intensity of X-rays diffracted on the (110) plane of the lattice of said crystal bears at least a ratio of 0.6 to that of X-rays diffracted on the (104) plane of said crystal lattice, shows a good catalytic activity for removal of the NO$_x$ gas from an exhaust. Further, the catalytic activity increases as the ratio becomes larger, namely, attains a maximum level at the ratio of 1.0.

A suitable catalyst for the method will best be understood and appreciated from the following description taken in connection with the accompanying drawings in which:

FIG. 1 is a sketch of an essential part of an image of diffracted X-rays taken from a recording chart with respect to a dehydrated Robe River iron ore;

FIG. 2 similarly shows an image of diffracted X-rays regarding a non-dehydrated raw Robe River iron ore;

Figure 7:
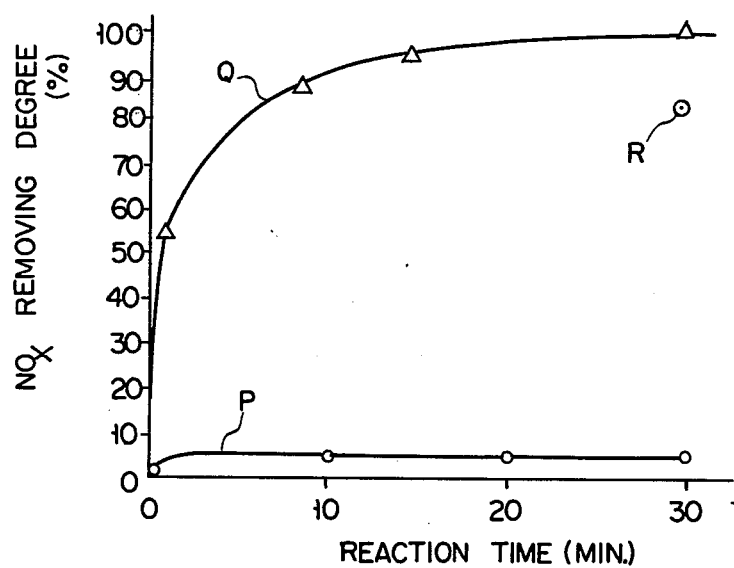
Figure 8:
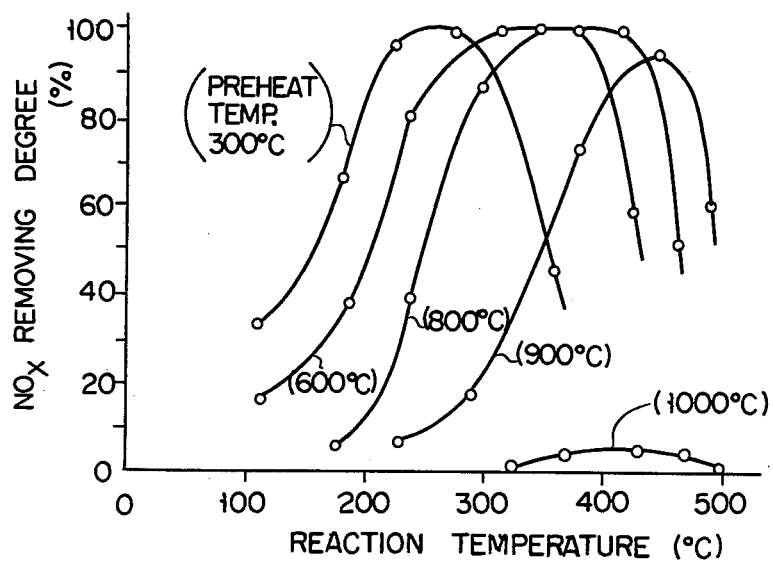

FIG. 7 is a graph showing the relation between the degree of removing $NO_x$ gas and reaction time required for said removal with a non-dehydrated raw Robe River iron ore used as a reduction catalyst; and FIG. 8 is a graph showing the relation between the degree of removing $NO_x$ gas, and the preheating and reaction temperatures required for the removal of $NO_x$ gas as measured on a Robe River iron ore as a catalyst for said removal.

With respect to various iron-oxide containing samples listed in Table 1, measurement was made of the ratio which the peak intensity of X-rays diffracted on the (110) plane of the lattice of a crystalline catalyst bears to that of X-rays diffracted on the (104) plane of said crystal lattice, the results being set forth in Table 2 below together with the data of Table 1.

Table 2

Ratio between the peak intensities of X-rays in various catalysts

| Sample | Mean degree of removing $NO_x$ gas (%) | Ratio between the peak intensities of X-rays on the crystal planes of (110) & (102) |
| --- | --- | --- |
| Robe River iron ore | 100 | 1.04 |
| Pyrite cinder | 71.9 | 0.71 |
| Iron oxide recovered from pickling solution | 79.2 | 0.70 |
| $Fe_2O_3$ reagent (No. 1) | 72.3 | 0.66 |
| $Fe_2O_3$ reagent (No. 2) | 51.0 | 0.59 |
| Hamersley iron ore | 84.0 | 0.82 |
| Krivoy Rog iron ore | 15.6 | 0.57 |
| Sungei gau iron ore | 100 | 1.01 |
| Sintered iron ore | 2.6 | 0.56 |

As seen from Table 2, a crystalline catalyst wherein the ratio between the peak intensities of X-rays diffracted on both planes of (110) and (104) indicated a larger value than 0.6 displayed a higher mean degree of removing the $NO_x$ gas than 70%. In contrast, a crystalline catalyst wherein said ratio fell below 0.6 showed too sharp a decline in the $NO_x$ gas removing capacity for practical use. Further, a crystalline catalyst wherein said ratio stood at about 1.0 effected 100% removal of the $NO_x$ gas.

Figure 1:
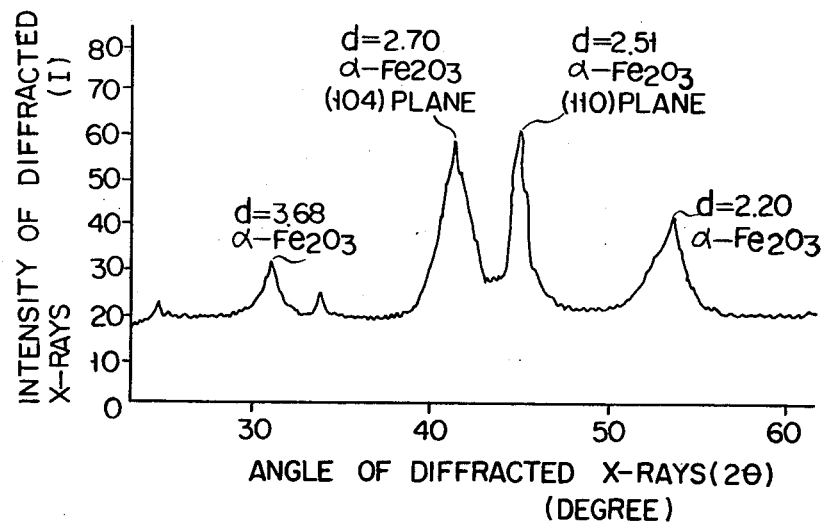

FIG. 1 is a sketch of the essential part of an image of diffracted X-rays taken from a recording chart, as measured on a raw Robe River iron ore preheated to 300° C. The recording chart indicated 62.0 I as the peak intensity of X-rays on the (110) plane of the lattice of crystalline $\alpha$-$Fe_2O_3$ constituting said Robe River iron ore, and 59.5 I as the similar peak intensity on the (104) plane of said crystal lattice. Thus, the ratio between the two peak intensities of X-rays on both (110) and (104) planes of the crystal lattice is expressed as 62.0I/59.5I = 1.04.

Figure 2:
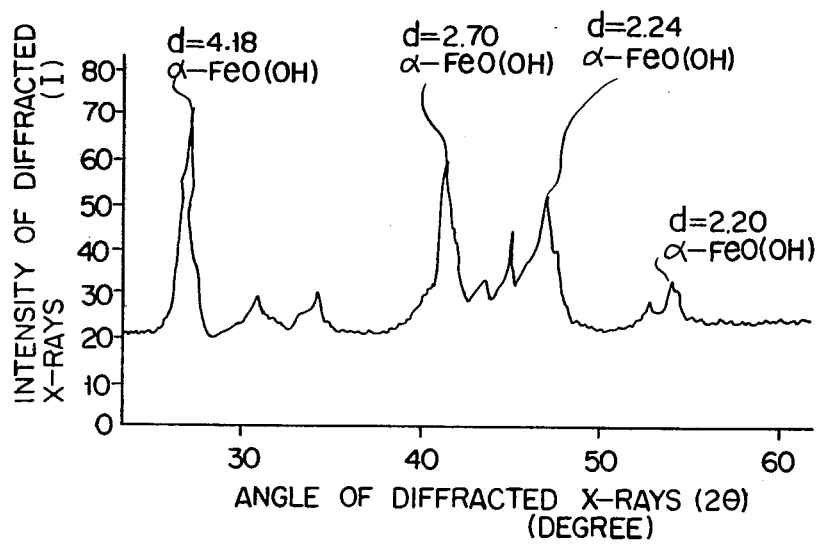

FIG. 2 is a sketch of the essential part of an image of diffracted X-rays observed in a non-preheated raw Robe River iron ore. The sketch is shown simply for reference. This catalyst lacked crystalline $\alpha$-$Fe_2O_3$ and displayed little catalytic activity as later described.

Figure 3:
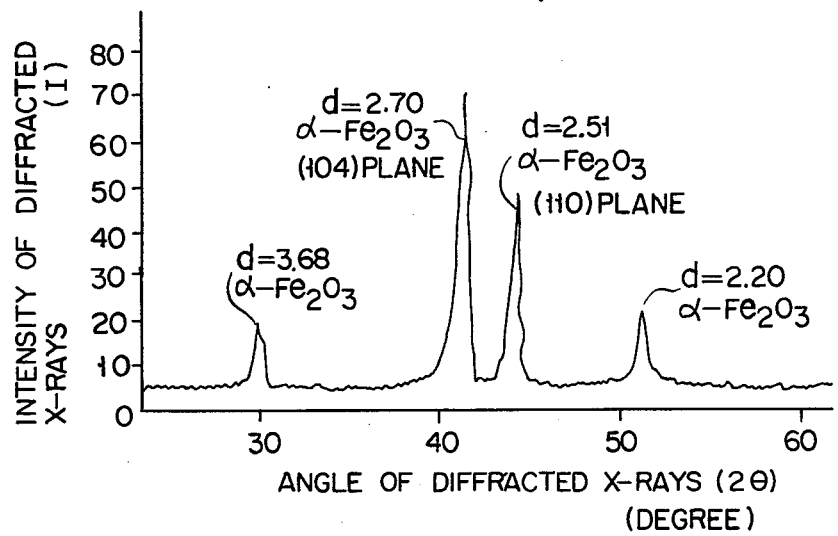
FIG. 3 is a similar sketch of an image of diffracted X-rays with regard to pyrite cinder.

FIG. 3 is a sketch of the essential part of an image of diffracted X-rays indicated in the recording chart as measured on pyrite cinder. The chart gas 51.0I as the peak intensity of X-rays on the (110) plane of the lattice of crystalline $\alpha$-$Fe_2O_3$ constituting said pyrite cinder, and 71.0I as the similar peak intensity on the (104) plane of said crystal lattice. Thus, the ratio between the peak intensities of X-rays on both (110) and (104) planes of the crystal lattice is expressed as 51.0I/71.6I = 0.71.

An iron oxide recovered from a pickling solution displayed substantially the same ratio between the peak intensities of X-rays diffracted on both planes of (110) and (104) of the crystal lattice as observed in the pyrite cinder.

Figure 4:
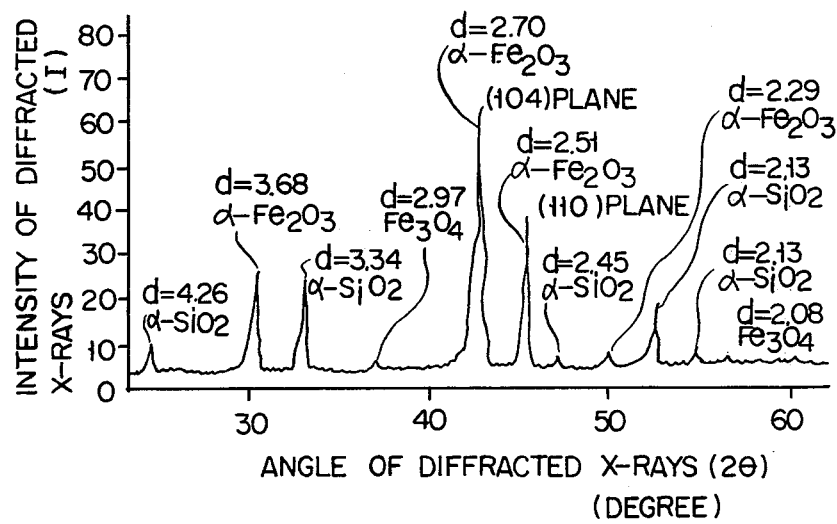
FIG. 4 is a similar sketch of an image of diffracted X-rays with regard to dehydrated Krivoy Rog iron ore.

FIG. 4 is a sketch of the essential part of an image of diffracted X-rays indicated on a recording chart as measured on the Krivoy Rog iron ore preheated to 300° C. The recording chart showed 40.0I as the peak intensity of X-rays diffracted on the (110) plane of the lattice of crystalline $\alpha$-$Fe_2O_3$ constituting said Krivoy Rog iron ore, and 70.0I as the peak intensity of X-rays diffracted on the (104) plane of said crystal lattice. Thus, the ratio of the two peak intensities of X-rays observed in said iron ore preheated to 300° C is expressed as 40.0I/71.0I = 0.57. Since this ratio is lower than 0.6, the Krivoy Rog iron ore showed as low an $NO_x$ gas removing capacity as 15.6%.

Figure 5:
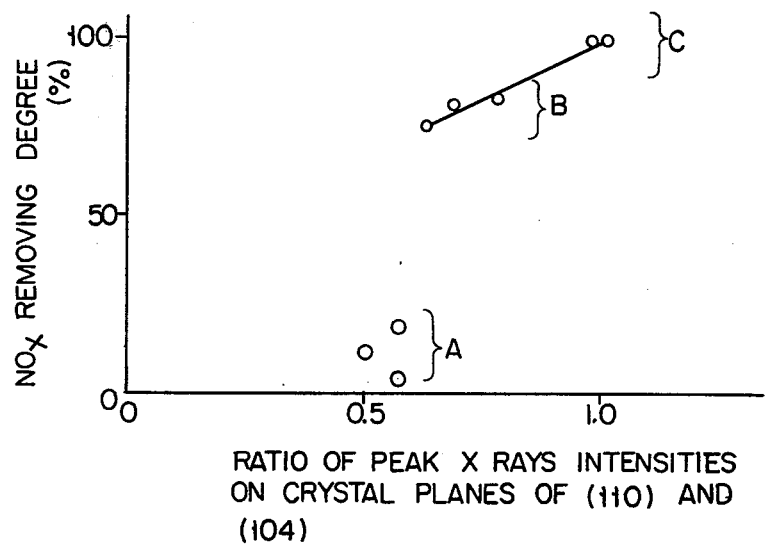
FIG. 5 is a graph showing the relation between the degree of removing NO$_x$ gas and the ratio which the peak intensity of X-rays diffracted on the (110) plane of the lattice of a crystalline catalyst bears to that of X-rays diffracted on the (104) plane of said crystal lattice as measured on various substances containing iron oxides.

Measurements and reactions were carried out with respect to many other iron ores in substantially the same manner as described above. The over all results of the measurements are set forth in the graph of FIG. 5. This graph shows that where the ratio between the peak intensities of X-rays diffracted on both (110) and (104) planes of the lattice of crystalline $\alpha$-$Fe_2O_3$ forming the tested iron ores fell from 0.6 to any slight extent, then the degree of removing the $NO_x$ gas dropped too sharply to display a practical catalytic activity, and conversely, where said ratio increased over 0.6 in any small degree, then the $NO_x$ removing capacity was prominently elevated, providing an industrially very useful catalytic activity. This relationship also applies to $\alpha$-$Fe_2O_3$ crystals forming other iron-oxide containing substances than iron ores. When the ratio reaches about 1.0, the degree of removing $NO_x$ gas rises to about 100%.

The A.S.T.M Card (Hanawalt method) gives 0.50 as the general standard for the ratio between the peak intensities of X-rays diffracted on the (110) and (104) planes of the lattice of crystalline $\alpha$-$Fe_2O_3$. However, as far as the measurements are concerned which we made on the above-mentioned ratio, most of the tested iron ores, which were preheated to 300° C, indicated a larger value than 0.6 as the above-defined ratio. Of course, some kind of iron ores (the A group of FIG. 5) showed a smaller ratio than 0.6. The A group includes, for example, Krivoy Rog iron ore and sintered iron ores. The B group of FIG. 5 includes pyrite cinder and iron oxide recovered from a pickling solution, etc. The C group of FIG. 5 includes Robe River iron ore and Sungei Gau iron ore.

A most inexpensive catalyst for removal of the $NO_x$ gas is an iron ore procurable from an ironworks. We conducted studies to find what type of iron ore would display an optimum catalytic activity for removal of the $NO_x$ gas. Based on our studies, we selected raw iron ores mainly consisting of hydrated iron oxide (typically represented by goethite FeO·(OH), that is ½ $Fe_2O_3$·$H_2O$). The selected samples were preheated about 30 minutes at a higher temperature than 300° C and modified into hematite ($\alpha$-$Fe_2O_3$) upon removal of combined water from the sample. The reason is that the iron ore containing combined water is quite useless as a catalyst for removing the $NO_x$ gas.

Figure 6:
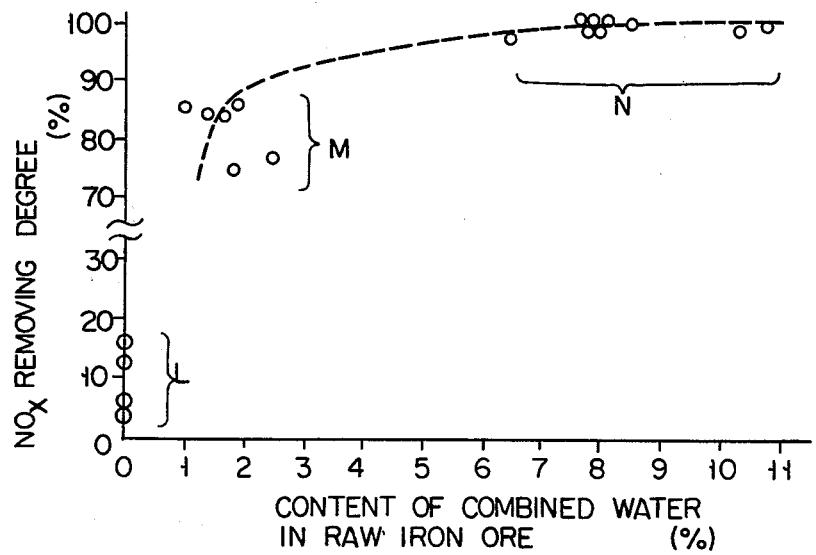
FIG. 6 is a graph showing the relation between the degree of removing the $NO_x$ gas and the content of combined water as measured on various raw iron ores.

FIG. 6 is a graph showing the relation between the degree of removing the $NO_x$ gas and the content of combined water in a raw iron ore. This graph shows that the larger the amount of combined water contained in an iron ore, the higher the catalytic activity displayed by said iron ore upon removal of the combined water. The $NO_x$ gas was removed at a temperature of 250° C with respect to all the catalysts used in the experiments of FIG. 6. An L group in FIG. 6 includes Krivoy Rog ore, Texada ore, etc. An M group includes Hamersley ore, Itabila ore, etc., and an N group includes Robe River ore, Goa ore, etc. The percent by weight of combined water contained in the tested iron ores was measured by a method specified in the Japanese Industrial Standard (JIS M 8211, 1971).

It was experimentally found that, unless preheated to a higher temperature than 300° C, the iron ores were not dehydrated with the resultant failure to remove the $NO_x$ gas. As mentioned afore, FIG. 7 is a graph showing the relation between the degree of removing $NO_x$ gas and the reaction time required for the removal of $NO_x$ gas, as measured on a non-dehydrated raw Robe River ore used as a reduction catalyst. The curve P shows the above mentioned relation when reaction for removal of the $NO_x$ gas was constantly carried out at a temperature of 250° C, namely, that combined water contained in a sample of iron ore was not driven off, resulting in only about 5% removal of the $NO_x$ gas. In contrast, the curve Q shows the aforesaid relation when the reaction temperature for removal of the $NO_x$ gas was fixed at 300° C. In the initial stage of this heating, the sample iron ore was dehydrated still insufficiently, resulting in the low removal of the $NO_x$ gas. However, as the heating further proceeded for about 10 minutes, said removal exceeded 85%, thus a combination of preheating and reaction heating brings about an effective removal of the $NO_x$ gas. For reference, a point R is given in FIG. 7 showing a raw iron ore dehydrated by being preheated 30 minutes at 300° C before the catalytic reaction process.

As described above, an iron ore mainly consisting of goethite is preheated to be modified into useful hematite. However, this process alone does not always provide a good catalyst. It is further necessary to select from among said hematite iron ores the type wherein the ratio between the peak intensities of X-rays diffracted on the (110) and (104) planes of the lattice of crystalline hematite has a value of at least 0.6.

Temperature of preheating goethite to modify it into hematite is, as previously described, chosen to be 300° C as the standard. Obviously, application of higher preheating temperature is possible. However, a catalyst preheated to a higher temperature than 300° C requires reaction temperature to be raised when said catalyst is used. FIG. 8 shows that where a catalyst is preheated to 300° C, an optimum reaction temperature is 250° to 300° C; when a catalyst is preheated to 800° C, an optimum reaction temperature is 350° to 430° C; and when preheated to 1000° C, a catalyst displays little capacity to remove the $NO_x$ gas. For the object of this invention, therefore, preheating is defined between 300° to 900° C. Where it is desired to carry out reaction at a relatively high temperature (up to 450° C), then good results are obtained if preheating is effected at as high a temperature as can be allowed within the aforesaid range of reaction temperatures.

The method of this invention is adapted to remove $NO_x$ gas contained in an exhaust from an ironworks, steam power plant or automobile. A raw iron ore used as a catalyst material for removal of the $NO_x$ gas is procurable at a lowcost particularly from an ironworks. Moreover, a spent catalyst can be used intact as a raw material for making iron. Consequently, the method of this invention offers great economic advantage in an ironworks.

This invention will be more fully understood by reference to the following examples.

EXAMPLE 1

$NO_x$ gas was removed from an exhaust under the conditions given below.

| Capacity of reactor (travelling catalyst zone type) | 1000 Nm³/hr. |
|---|---|
| $NO_x$ content in an exhaust from an iron-ore sintering plant | 170 to 200 ppm |
| Amount of ammonia gas added | 300 ppm |
| Space velocity | 5000/hr. |
| Temperature at a gas inlet of the reactor | 400° C |

A catalyst material of Robe River iron ore containing 8% combined water and measuring 8 to 12 mm in particle size was preheated at 300° C for 30 minutes. The ratio between the peak intensities of X-rays diffracted on the (110) and (104) planes of the lattice of crystalline $\alpha$-$Fe_2O_3$ constituting said preheated ore had a value of 1.04. An operation of removing the $NO_x$ gas was continued for one month using the above-mentioned preheated catalyst. Throughout the operation, the $NO_x$ gas was removed at the rate of 98% on average.

EXAMPLE 2

A catalyst used for removal of the $NO_x$ gas consisted of the type of pyrite cinder wherein the ratio between the peak intensities of X-rays diffracted on the (110) and (104) planes of the lattice of crystalline $\alpha$-$Fe_2O_3$ constituting said pyrite cinder had a value of 0.71. Said removal was continued for one month under the same conditions and using the same type of reactor as in Example 1. Throughout the operation, the $NO_x$ gas was removed at the rate of 70% on average.

EXAMPLE 3

A catalyst used for removal of the $NO_x$ gas consisted of the same kind of iron ore as in Example 1 was preheated at 800° C for 10 minutes. Said removal was continued for one month under the same conditions and using the same type of reactor as in Example 1. Throughout the operation, the $NO_x$ gas was removed at the rate of 98% on average.

EXAMPLE 4

A catalyst used for removal of the $NO_x$ gas consisted of the Itabira iron ore (Brazil) containing 2% combined water and measuring 3 to 8 mm in particle size. Said removal was continued for one month using the same kind of reactor as in Example 1, and under the following conditions.

| Preheating temperature | 400° C |
|---|---|
| Preheating time | 20 minutes |
| Temperature of reaction for removal of the $NO_x$ gas | 300° C |

Throughout the operation, the $NO_x$ gas was removed at the rate of 91% on average.

What we claim is:

1. In the method for reducing $NO_x$ gas contained in an exhaust gas to $N_2$ gas wherein the exhaust gas is contacted with $NH_3$ gas and an iron oxide catalyst, the improvement wherein the catalyst consists essentially of a hematite iron ore modified from a goethite iron ore by preheating the goethite iron ore at a temperature of from 300° to 900° C., and having a ratio defined by the peak intensity of X-rays diffracted on the (110) plane of the lattice of the hematite crystals therein to that of X-rays diffracted on the (104) plane of said crystal lattice of from 0.6 to about 1.0.

2. The method of claim 1, wherein said ratio is about 1.0

* * * * *